United States Patent
Gunter et al.

(10) Patent No.: US 7,055,027 B1
(45) Date of Patent: May 30, 2006

(54) SYSTEM AND METHOD FOR TRUSTED INSPECTION OF A DATA STREAM

(75) Inventors: David Gunter, Redmond, WA (US); Leeon Moshe Shachaf, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 868 days.

(21) Appl. No.: 09/274,294

(22) Filed: Mar. 22, 1999

(51) Int. Cl.
*G06F 13/36* (2006.01)

(52) U.S. Cl. .................. 713/151; 709/223; 709/224; 726/3

(58) Field of Classification Search ........... 713/154, 713/161, 168, 170, 176, 201; 380/285, 30
See application file for complete search history.

(56) References Cited

U.S. PATENT DOCUMENTS

| | | | |
|---|---|---|---|
| 5,214,702 A | * | 5/1993 | Fischer |
| 5,835,726 A | * | 11/1998 | Shwed et al. |
| 2001/0034708 A1 | * | 10/2001 | Walker et al. |

OTHER PUBLICATIONS

Bruce Schneier, Applied Cryptography, 1996, John Willey & Sons, Inc. Second Edition, p. 31-48.*

* cited by examiner

*Primary Examiner*—Christopher Revak
*Assistant Examiner*—Taghi T. Arani
(74) *Attorney, Agent, or Firm*—Lee & Hayes PLLC

(57) ABSTRACT

A network architecture allows an intermediary to inspect an encrypted data stream on a virtual private network (VPN) in a secure and trusted manner. The endpoints establish a virtual private network by negotiating a session key used to encrypt data being exchanged between them. The endpoints know the session key, but not the intermediary. To grant the intermediary trusted access to the data stream on the VPN, one endpoint securely transfers the session key to the firewall by encrypting the session key using the intermediary's public key and then signing the encrypted session key. The intermediary authenticates the signature and decrypts the session key using its own private key. If the process yields a valid key, the intermediary is assured that the session key was sent by the endpoint and was not subsequently tampered with in route. Once the session key is transferred, the firewall can decrypt and inspect the data stream on the VPN in a manner that is transparent to the endpoints.

20 Claims, 4 Drawing Sheets

SYSTEM AND METHOD FOR TRUSTED INSPECTION OF A DATA STREAM

TECHNICAL FIELD

This invention relates to network systems and protected communication over network systems. More particularly, this invention relates to systems and methods for inspecting protected data communication in a trusted manner.

BACKGROUND

The Internet and World Wide Web ("Web") have grown rapidly into an essential backbone for business communications. The Internet, however, is a public and open network that offers no inherent protection to data communication. Yet, today's business environment (as well as others) demand manageable and secure data communication over such public networks.

Many organizations are now using the Internet as a data transmission medium between different proprietary networks. To enable this communication over an otherwise public network, data is commonly encrypted into a protected form. This affords essentially the same protection and security as a private network, while benefiting from the flexibility and lower costs offered by the Internet. To this end, the concept of a virtual private network (VPN) has been developed.

A virtual private network provides a secure, authenticated mechanism for communicating between two endpoints, such as between two networks. The VPN establishes an encrypted data flow between the two endpoints. Since there is not an actual private network connection in place, and the data is actually being routed over the Internet, this data flow can be thought of as a "tunnel" through the Internet. Data conceptually enters the tunnel at one end and emerges, secure and unchanged, at the other end.

To ensure that the transmission is secure, the data must be protected from unauthorized access during transmission over the Internet. Consider how a malicious party could access this data. A malicious party could read and record the data, or modify it in some way, or even replace the valid data with different data. The source of the data could be disguised by changing the electronic source address of the Internet Protocol (IP) header in the data stream.

Data transmitted via a VPN is therefore encrypted to prevent any inspection or modification. Various protocols exist that provide security and authentication features for VPNs. Point-to-Point Tunneling Protocol (PPTP) and the Internet Engineering Task Force's IPSEC specification are the two most common VPN protocols.

Point-to-point tunneling protocol (PPTP) is a network protocol that enables the secure transfer of data from a remote client to a private enterprise server by creating a virtual private network across TCP/IP-based data networks. PPTP supports on-demand, multi-protocol, and virtual private networking over public networks such as the Internet. The networking technology of PPTP is an extension of the remote access point-to-point protocol defined in the document by the Internet Engineering Task Force (IETF) titled "The Point-to-Point Protocol for the Transmission of Multi-Protocol Datagrams over Point-to-Point Links," referred to as RFC 1171. PPTP is a network protocol that encapsulates PPP packets into IP datagrams for transmission over the Internet or other public TCP/IP-based networks. PPTP can also be used in private LAN-to-LAN networking.

IP Security (IPSEC) is a network protocol designed by the Internet Engineering Task Force (IETF) for the Internet Protocol that supports network-level authentication, data integrity, and encryption. Encryption is encoded via a shared secret key, typically generated by the Diffie-Hellman Key Agreement algorithm. IP Security uses an Authentication Header (AH) and an Encapsulated Security Payload (ESP). The authentication header provides data communication with source authentication and integrity. The encapsulated security payload provides confidentiality in addition to authentication and integrity. With IP security, only the sender and recipient know the security key. If the authentication data is valid, the recipient knows that the communication came from the sender, and that it was not changed in transit.

The data payload in packets transmitted over a VPN is encrypted. The routing information, such as the source and destination addresses, is left unencrypted to enable routing through the network. However, it is possible to secure the routing components by calculating a value, such as a checksum, based on the contents of the address fields and then encrypt the checksum along with the data payload.

FIG. 1 shows one example of encrypting a data packet according to IPSEC. A data packet 20 comprises a data payload 22 and routing header 24 that contains addressing information. A hashing unit 26 cryptographically hashes the entire packet, including the routing header, using a hashing algorithm (e.g., MD4, MD5) and a resultant hash value (HV) 28 is appended to the packet. An encrypting unit 30 then encrypts the data payload 22 and appended hash value 28. The unencrypted routing header is appended to the encrypted portion 32 and the packet is sent out.

The destination receives the packets and decrypts the encrypted portion 32. It then recalculates the hash value from the decrypted data payload and the routing header. If a malicious user were to attempt to rewrite any of the unencrypted data, the hash value calculated by the receiver would not match the accompanying hash value 28, and the unauthorized modification would be detected.

A drawback in these VPN protocols is that the encryption mechanisms prevent all data stream inspection, even inspection for legitimate purposes. There are situations when a party would like to access and inspect the encrypted data before it reaches its final destination. For example, a network access point such as a firewall or proxy server may want to perform virus scanning or implement policy based access controls. The firewall might like to strip off one address (say a general address to a company that is given out publicly) and replace it with internal addresses used behind the firewall. However, since the original address is used to create the encrypted payload, it cannot be later stripped away and replaced with another address without detrimentally hindering the destination's ability to restore the original packet. The only way to engage in legitimate inspection is to have access to the unencrypted data stream, which is counter to the basic design of a virtual private network.

Accordingly, there is a need for a secure mechanism that allows a trusted computer system to function as a trusted man-in-the-middle and have access to the unencrypted version of the data flowing through a virtual private network.

SUMMARY

The invention concerns a network architecture in which two endpoints communicate via a virtual private network (VPN) on an otherwise public network, such as the Internet, and an intermediary is permitted to inspect the data communication in a secure and trusted manner.

In one implementation, the network architecture has an external client and an internal client that exchange encrypted data over a network. The internal client is coupled to the network via a network access point, such as a firewall/proxy server. All three participants have their own pair of public/private keys. An independent key server holds the public keys for all three participants.

The external and internal clients establish a virtual private network by negotiating a session key used to encrypt data being exchanged between them. Initially, only the clients know the session key, and not the firewall. To grant the firewall trusted access to the data stream on the VPN, the internal client securely transfers the session key to the firewall. The internal client requests and receives the firewall's public key from the key server and encrypts the session key using the firewall's public key. The internal client then signs the encrypted key by encrypting it using the internal client's private key.

The firewall authenticates the signature by decrypting the message using the internal client's public key (obtained from the key server or directly from the internal computer). The firewall then decrypts the session key using its own private key. If the dual decryption yields a valid key, the firewall is assured that the session key was sent by the internal client and was not subsequently altered or tampered with in route.

Once the session key is transferred, the firewall is able to decrypt the data stream on the VPN. The firewall can now unintrusively inspect the data stream in a manner that is transparent to the external and internal clients.

DETAILED DESCRIPTION

This invention concerns a network architecture that enables secure communication between two endpoints via a virtual private network (VPN) on an otherwise public network, such as the Internet. The architecture allows an intermediary to gain trusted access to the data stream in the VPN. Trusted access is achieved through a combination of public and private key protocols. Toward that end, the following discussion assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996).

Network Architecture

Figure 1:
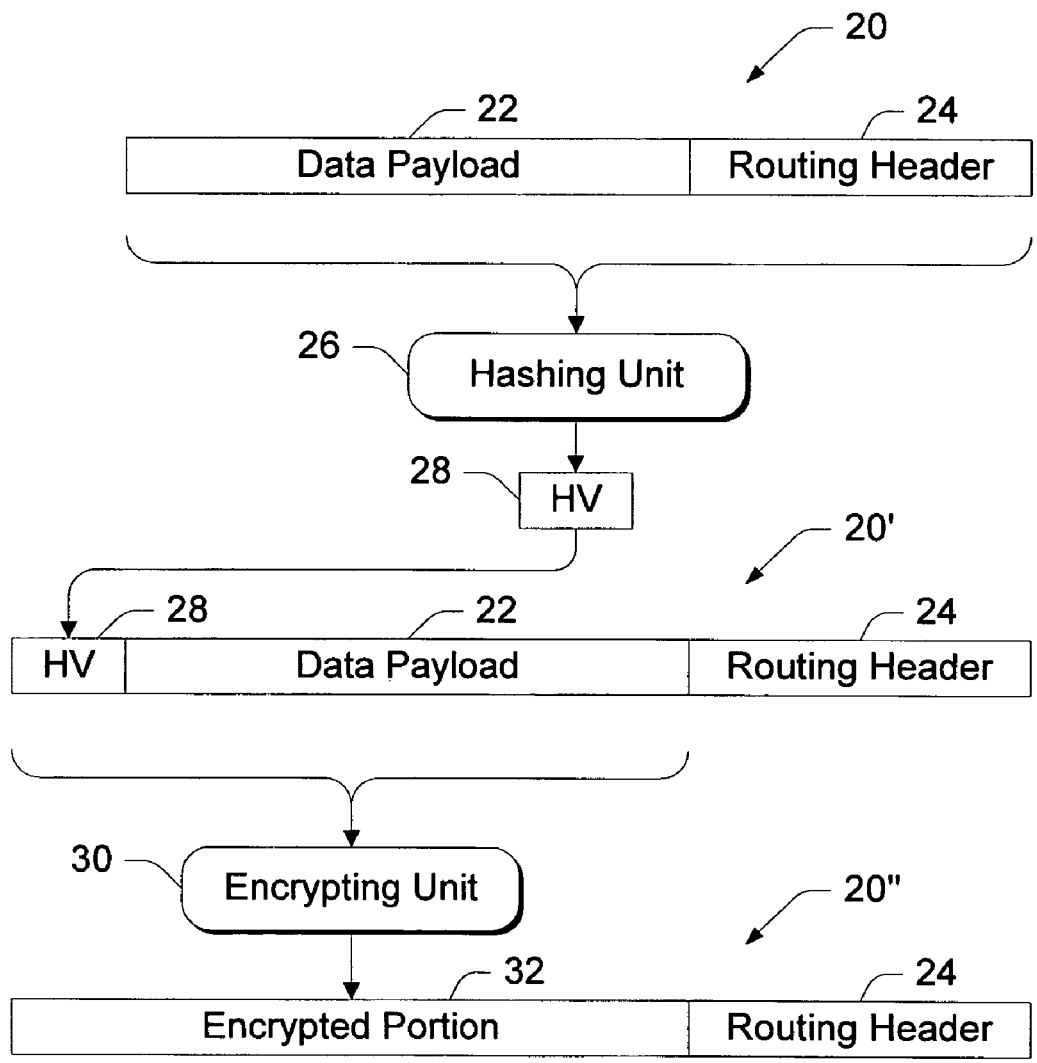
FIG. 1 shows a prior art packet encryption process employed by a conventional virtual private network protocol.
Figure 2:
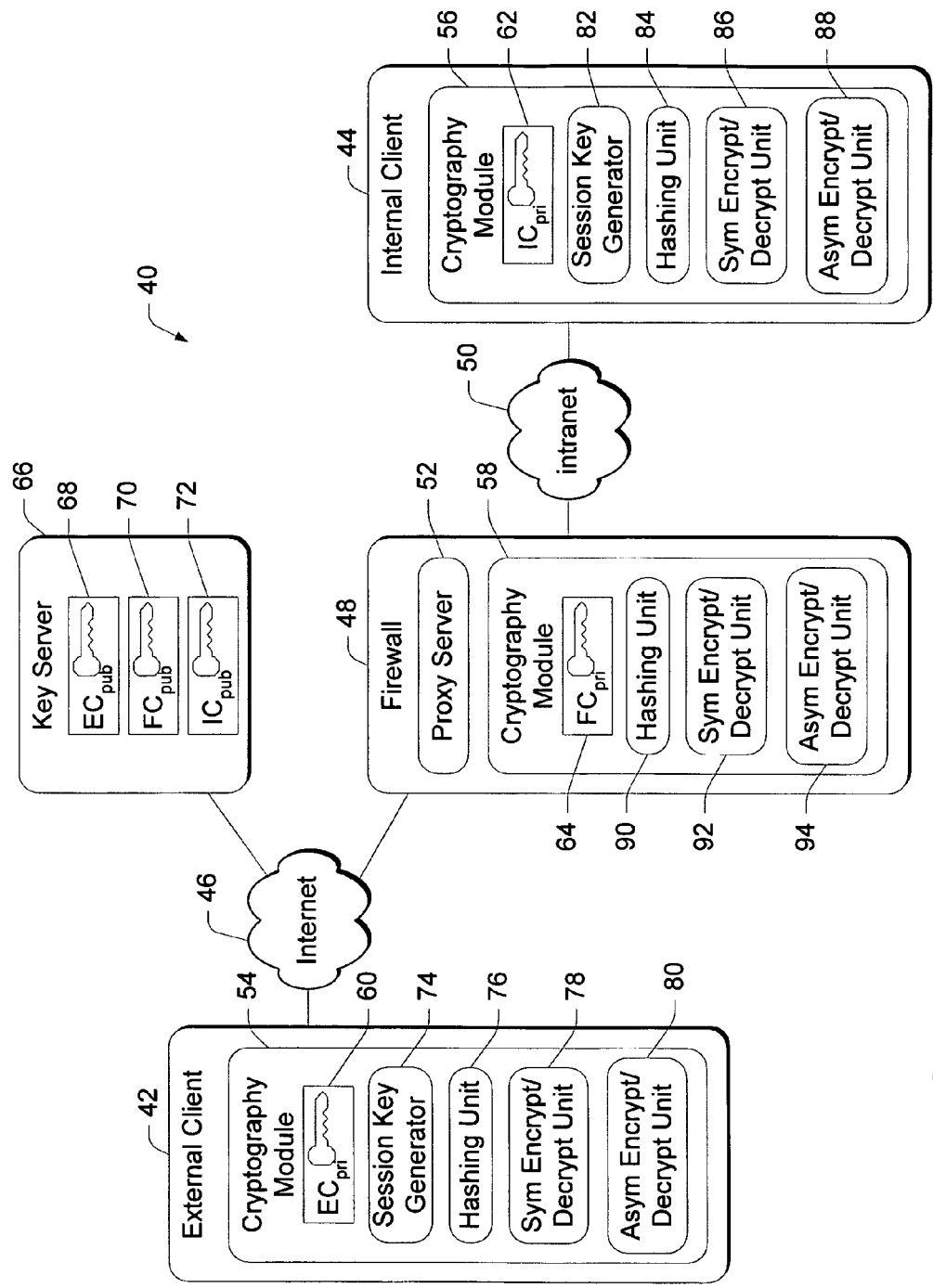
FIG. 2 shows a network system having external and internal computing units that communicate securely over a network, and a trusted intermediary computing unit that has trusted access to the encrypted data stream.

FIG. 2 shows a network system 40 having an external client computer 42 that communicates with an internal client computer 44 via a public network, such as the Internet 46. The two computers employ a virtual private network (VPN) through the Internet 46 to communicate with one another. Data is communicated through a network access point, embodied in this example as a firewall computer 48, which resides on the internal client's side of the Internet 46. A proprietary intranet 50 connects the firewall 48 and the internal client 44. The firewall 48 is configured with proxy server software 52, such as Microsoft Proxy Server, to support firewall functionality.

All three participants–external client 42, internal client 44, and firewall 48–are equipped with cryptography modules 54, 56, and 58, respectively. Each cryptography module enables various cryptographic functionality, including encryption, decryption, hashing, authentication, and signing. All three participants also have their own pair of public/private keys. The private keys are stored at the respective computers, as represented by external client private key ($EC_{pri}$) 60 at external client 42, internal client private key ($IC_{pri}$) 62 at internal client 44, and firewall computer private key ($FC_{pri}$) 64 at firewall 48.

An independent key server 66 holds corresponding public keys 68, 70, and 72 for external client 42, internal client 44, and firewall 48, respectively.

All three cryptography modules 54, 56, and 58 contain similar components. At external client 42, the cryptography module 54 has a session key generator 74 that generates secret session keys used in communication over the VPN and a hashing unit 76 that employ hashing algorithms (e.g., MD4, MD5, etc.) to compute hash digests for use in encrypting the data packets or for purposes of creating a digital signature. The external client 42 also has symmetric encryption/decryption unit 78 that encrypts or decrypts items using a symmetric key algorithm, and an asymmetric encrypt/decryption unit 80 that encrypts or decrypts items using an asymmetric key algorithm.

At internal client 44, the cryptography module 56 has a session key generator 82, a hashing unit 84, a symmetric encrypt/decrypt unit 86, and an asymmetric encrypt/decrypt unit 88. At firewall 48, the cryptography module 58 has a hashing unit 90, a symmetric encrypt/decrypt unit 92, and an asymmetric encrypt/decrypt unit 94.

The "asymmetric" algorithm employed in the asymmetric encrypt/decrypt units 80, 88, and 94 uses the public and private key pairs. The separate keys are based upon a mathematical relationship in which one key cannot be calculated from the other key. Encryption and decryption using an asymmetric key pair can be represented as follows:

$$Asym.E_{Kpri}(M)=M.enc$$

$$Asym.D_{Kpub}(M.enc)=M$$

where "$Asym.E_{Kpri}$" is an encryption function using a private key "Kpri," "M" is a message, "M.enc" is an encrypted version of the plain text message, and "$Asym.D_{Kpub}$" is a decryption function using the public key "Kpub". The inverse is also true in that a message can be encrypted using the public key and then decrypted using the private key. In a public key system, the public key can be distributed to other parties, such as the key server 66, and the private key is maintained in confidence at the respective party. An example asymmetric algorithm is the well-known RSA cryptographic algorithm named for the creators Rivest, Shamir, and Adleman.

The cryptography modules 54, 56, and 58 may be implemented in many ways. In one implementation, the module is embodied as a cryptographic API (Application Program Interface) exposed in Windows-brand operating systems, such as the Windows NT operating system. The cryptographic API ("CAPI" or "CryptoAPI") is described in U.S. Pat. No. 5,689,565, entitled "Cryptography System and Method for Providing Cryptographic Services for a Computer Application", which is assigned to Microsoft Corporation. This patent is hereby incorporated by reference.

According to the network architecture in FIG. 2, the external and internal clients 42, 44 establish a virtual private network connection through the Internet 46. The computers engage in a key negotiation process to negotiate a session key. The key negotiation process is dependent upon the VPN communication protocol. In the illustrated example, the participants select a shared symmetric session key. Once a shared session key is found, the external and internal clients begin an encrypted communication session.

Firewall 48 is permitted to inspect the data stream passing through it on the VPN. The internal client 44 transmits the shared session key to the firewall 48 in a secure manner, preferably via public key technology. Once the firewall has the session key, it can dynamically decrypt traffic in the VPN data stream and monitor its content. Trusted inspection of the data stream is completely transparent to both parties in the VPN communication.

One exemplary implementation of this process is described below under the heading "Operation" and with reference to FIG. 4. Prior to explaining this process, however, an exemplary implementation of a computer used to implement anyone of the participants is described.

Exemplary Computer

Figure 3:
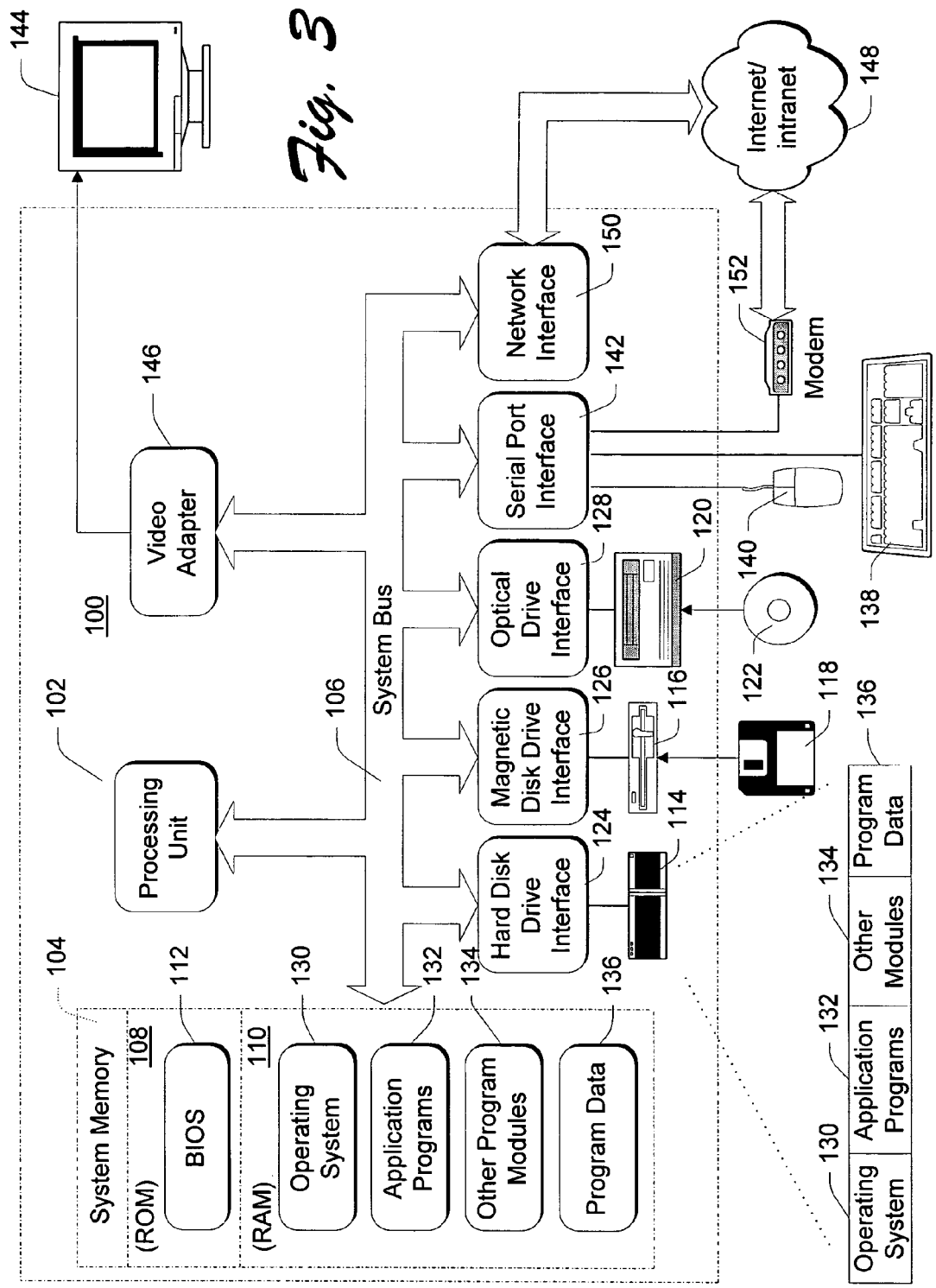
FIG. 3 shows an exemplary computer that can be configured as one of the computing units in the network system.

FIG. 3 shows an exemplary implementation of a computer, such as the external client 42, the internal client 44, firewall 58, or key server 66. The host computer is a general-purpose computing device in the form of a conventional personal computer 100 that is configured to operate as a network server (in the case of the firewall and key server computers) or as a client computer (in the case of the external and internal clients).

Computer 100 includes a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory 104 includes read only memory (ROM) 108 and random access memory (RAM) 110. A basic input/output system 112 (BIOS) is stored in ROM 108.

Computer 100 also has one or more of the following drives: a hard disk drive 114 for reading from and writing to a hard disk, a magnetic disk drive 116 for reading from or writing to a removable magnetic disk 118, and an optical disk drive 120 for reading from or writing to a removable optical disk 122 such as a CD ROM or other optical media. The hard disk drive 114, magnetic disk drive 116, and optical disk drive 120 are connected to the system bus 106 by a hard disk drive interface 124, a magnetic disk drive interface 126, and an optical drive interface 128, respectively. The drives and their associated computer-readable media provide non-volatile storage of computer readable instructions, data structures, program modules and other data for the personal computer. Although a hard disk, a removable magnetic disk and a removable optical disk are described, other types of computer readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 130, one or more application programs 132, other program modules 134, and program data 136. The programs 132 or modules 134, for example, include the cryptography module installed at each participant.

A user may enter commands and information into the personal computer 100 through input devices such as keyboard 138 and pointing device 140. Other input devices (not shown) may include a microphone, joystick, game pad, satellite dish, scanner, or the like. These and other input devices are often connected to the processing unit 102 through a serial port interface 142 that is coupled to the system bus 106, but may be connected by other interfaces, such as a parallel port, game port, or a universal serial bus (USB). A monitor 144 or other type of display device is also connected to the system bus 106 via an interface, such as a video adapter 146. In addition to the monitor, personal computers typically include other peripheral output devices (not shown) such as speakers and printers.

The server computer 100 is connected to a network 148 (e.g., Internet 46, intranet 50) through a network interface or adapter 150, a modem 152, or other means for establishing communications over the network. The modem 152, which may be internal or external, is connected to the system bus 106 via the serial port interface 142.

Operation

The network architecture enables trusted inspection of a data stream on a virtual private network established between the external and internal clients. As background, it is assumed that the participating computers have previously generated their own pairs of private and public keys. It is further assumed that the private keys are installed locally in a registry at each respective computer and the public keys are stored in a file system or system registry at the key server 66.

Figure 4:
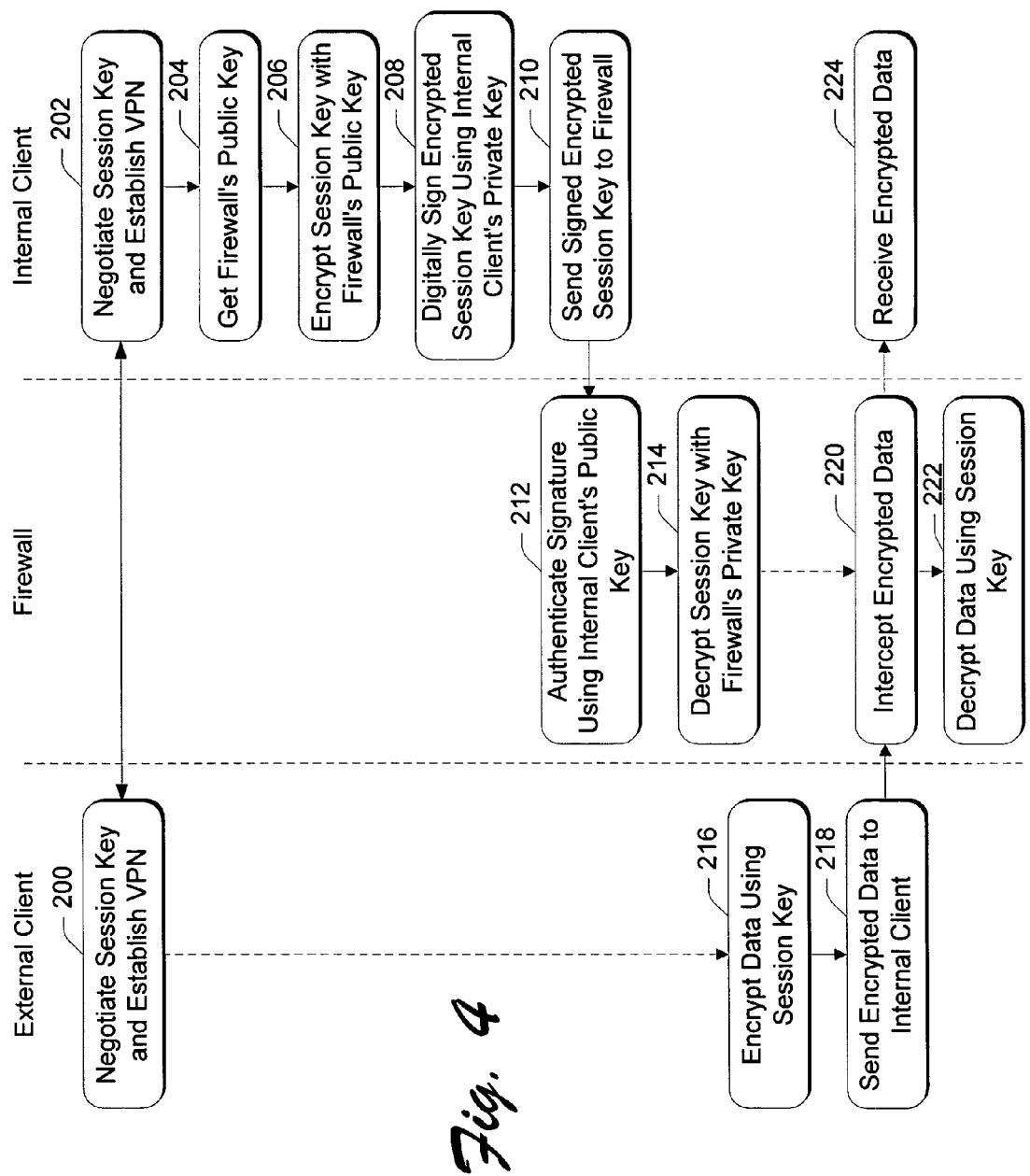
FIG. 4 is a flow diagram showing steps in a method implemented for trusted inspection of a data stream.

FIG. 4 shows steps in the trusted inspection process. The steps are performed in software, hardware, or a combination of hardware and software. The steps are described with respect to the architecture of FIG. 2.

At steps 200 and 202, the external client 42 and internal client 44 establish a virtual private network connection by negotiating a session key (SK). The firewall 48 opens appropriate ports to allow the VPN key negotiation process to proceed. The key negotiation process is specific to the VPN protocol. In most key negotiation processes, the two endpoint systems use a combination of public and private keys to generate and exchange a session key. In some cases, such as with PPTP, a session key is derived using a binary challenge. The key negotiation process is designed to prevent cleartext transmission of the session key. The session key is either (1) generated and transmitted via public key encryption or (2) derived independently by both parties, as in the case of the well-known Diffie-Hellman key exchange. The external and internal clients employ session key generators 74 and 82, respectively, to define the session key and their own key pairs to exchange the session key securely.

Once the external and internal clients 42, 44 have selected and communicated a shared session key (SK), they are able to tunnel encrypted data through the Internet. To enable trusted data stream inspection, the firewall 48 needs to know the shared session key. The VPN participant that operates on the same intranet 50 with the firewall 48 (in this case, the internal client 44) is responsible for getting the shared session key to the firewall 48 in a secure manner.

At step 204, the internal client 44 requests and receives the firewall's public 1 key $FC_{pub}$ 70 from the key server 66. Alternatively, the firewall passes its public key directly to the internal client 44 over the intranet 50. The internal client 44 employs the asymmetric encryption/decryption unit 88 to encrypt the shared session key SK using the firewall's public key $FC_{pub}$ 70 (step 206). This is represented as follows:

$$Asym.E_{FCpub}(SK)=SK.enc$$

where "Asym.E$_{FCpub}$" is an asymmetric encryption function using the firewall computer's public key "FC$_{pub}$", and the resultant "SK.enc" is an encrypted version of the session key. Since only the firewall 48 knows the corresponding private key FC$_{pri}$, only the firewall will be able to decrypt the session key, thereby ensuring secure transfer.

At step 208, the internal client digitally signs the encrypted session key "SK.enc" by encrypting a message containing the encrypted session key, or a hash digest of it, using its own private key IC$_{pri}$ 62. This is represented as follows:

$$Asym.E_{ICpri}(SK.enc)=\text{Signed}(SK.enc)_{IC}.$$

where "Asym.E$_{ICpri}$" is an asymmetric encryption function using the internal client's private key "IC$_{pri}$", and the output "Signed(SK.enc)$_{IC}$" is the signed result. With the signature, the firewall can authenticate that the message came from the internal client and not an imposter.

At step 210, the internal client 44 transfers the signed, encrypted session key over the intranet 50 to the firewall 48.

When the firewall 48 receives the signed encrypted session key, it first authenticates the signature by decrypting the message using the internal client's public key IC$_{pub}$ 72 (step 212). The firewall retrieves this public key from the key server 66, or receives it in the message from the internal client 44. Alternatively, the internal client's public key is already pre-cached at the firewall. The firewall invokes the asymmetric encryption/decryption unit 94 to perform the following decryption process:

$$Asym.D_{ICpub}(\text{Signed}(SK.enc)_{IC})=SK.enc$$

where "Asym.D$_{ICpub}$" is an asymmetric decryption function using the internal client's public key "IC$_{pub}$". At step 214, the firewall uses the asymmetric encryption/decryption unit 94 to decrypt the session key SK using its own private key "FC$_{pri}$", as follows:

$$Asym.D_{FCpri}(SK.enc)=SK$$

where "Asym.D$_{FCpri}$" is an asymmetric decryption function using the firewall computer's private key "FC$_{pri}$". At this point, the session key has been securely transferred to the firewall.

Once the firewall 48 gains possession of the session key, it can dynamically decrypt traffic in the VPN data stream between the external and internal clients, and monitor the content of the data stream. Trusted data stream is completely transparent to both parties in the VPN communication. It is noted that the trusted inspection process is applicable for VPN protocols that require exchanges to take place at regular intervals. Whenever a new key negotiation session completes, the internal client simply forwards the new shared session key to the network access point as it did initially.

At step 216, the external client 42 calls the symmetric encryption/decryption unit 78 to encrypt data destined for the internal client 44 using the session key SK negotiated at steps 200 and 202. This is represented as follows:

$$Sym.E_{SK}(\text{Data})=Data.enc$$

where "Sym.E$_{S1}$" is a symmetric encryption function using a session key "SK" and "Data.enc" is an encrypted version of the data. The encrypted data is transmitted over the Internet 46 (step 218), where it is intercepted at the firewall 48 (step 220). The firewall 48 invokes symmetric encryption/decryption unit 92 to decrypt the encrypted data stream using the same session key SK that it received from the internal client 44 (step 222), as follows:

$$Sym.D_{SK}(Data.enc)=\text{Data}$$

where "Sym.D$_{SK}$" is a symmetric decryption function using a session key "SK". Once the data is decrypted, the firewall 48 has several options available. It can forward the encrypted data onto the internal client (step 224). It can perform tasks based on the unencrypted data, such making internal routing decisions or other policy considerations. The firewall 48 may also cache or store a decrypted version of the data while forwarding on the encrypted version to the internal client.

CONCLUSION

The invention advantageously provides a network architecture that allows legitimate trusted inspection of a VPN data stream at an intermediary, such as a firewall or proxy server. Public key encryption and signing techniques are employed to securely transfer a VPN session key from a VPN endpoint to the firewall. The cryptography techniques allow the firewall to authenticate that the session key came from the VPN endpoint and was not subsequently tampered with by a third party.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for inspecting an encrypted data stream being transferred over a network between two endpoints, the data steam being encrypted using a session key known to both endpoints, the method comprising:
   securely transferring the session key from one of the endpoint to an intermediary having access to the encrypted data stream;
   decrypting the encrypted data stream at the intermediary using the session key; and
   inspecting the data stream following decryption.

2. A method as recited in claim 1, wherein securely transferring comprises:
   encrypting the session key using a public key associated with the intermediary; and
   sending the encrypted session key to the intermediary.

3. A method as recited in claim 1, wherein securely transferring comprises:
   encrypting the session key using a public key associated with the intermediary;
   signing the encrypted session key using a private key associated with the one of the endpoints; and
   sending the signed and encrypted session key to the intermediary.

4. A method as recited in claim 1, further comprising storing the data stream at the intermediary.

5. A method for inspecting an encrypted data stream being transferred over a network between two endpoints and via an intermediary, the data stream being encrypted using a session key known to both endpoints, the method comprising:
   storing a public key from a public/private key pair associated with one of the endpoints at a key storage;
   storing a public key from a public/private key pair associated with the intermediary at the key storage;
   obtaining, at said one endpoint, the intermediary's public key from the key storage;
   encrypting, at said one endpoint, the session key using the intermediary's public key to produce an encrypted session key;

encrypting, at said one endpoints the encrypted session key using a private key from the public private key pair associated with said one endpoint to produce a signed encrypted session key;

passing the signed encrypted session key to the intermediary;

obtaining, at the intermediary, the one endpoint's public key from the key storage;

decrypting, at the intermediary, the signed encrypted session key using the one endpoint's public key to return the encrypted session key, decrypting, at the intermediary, the encrypted session key using the intermediary's private key to return the session key; and using the session key at the intermediary to decrypt the encrypted data stream.

6. In a network system in which an encrypted data stream is transferred over a network between two endpoints and via an intermediary, the data stream being encrypted using a session key known to both endpoints, computer-readable media at one of the endpoints and at the intermediary storing computer-executable instructions for performing the method as recited in claim 5.

7. In a network system having an internal client that exchanges encrypted data with an external client over a network and through a firewall intermediate of the internal and external clients, the encrypted data being encrypted using a session key known to the internal and external clients, a method executed at the firewall comprising:

receiving an encrypted and signed session key from the internal client, the encrypted and signed session key bearing a digital signature of the internal client;

authenticating the digital signature as belonging to the internal client;

decrypting the session key; and decrypting the encrypted data being exchanged between the internal and external clients using the session key.

8. A method as recited in claim 7, wherein the encrypted and signed session key is encrypted using a public key from a public/private key pair associated with the firewall, and the decrypting comprises decrypt the session key using a private key from the pubic/private key pair.

9. A method as recited in claim 7, further comprising inspecting the data in an unencrypted form.

10. A method as recited in claim 7, further comprising storing the data in an unencrypted form.

11. In a network system having an external client that exchanges encrypted data with an external client aver a network and through a firewall intermediate of the internal and external clients, the encrypted data being encrypted using a session key known to the internal and external clients, a computer-readable medium resident at the firewall storing computer-executable instructions for performing method as recited in claim 7.

12. A network system comprising:

an internal client device and an external client device configured to communicate encrypted data over a network using virtual private network communication, the data being encrypted using a session key;

an intermediary device having access to the encrypted data being communicated between the internal client device and the external client device;

the internal client device being configured to securely transfer the session key to the intermediary device; and the intermediary device being configured to decrypt the data using the session key and to inspect the data.

13. A network system as recited in claim 12, wherein the internal client device encrypts the session key prior to sending it to the intermediary device.

14. A network system as recited in claim 12, wherein the internal client device encrypts and signs the session key prior to sending it to the intermediary device.

15. A network system as recited in claim 12, wherein the intermediary device stores the data in unencrypted form.

16. A software architecture for a network system having two endpoints that exchange encrypted data over a network and through an intermediary, the encrypted data being encrypted using a session key known to the endpoints, comprising:

endpoint-resident code stored on computer readable media and executable on a processor to encrypt the session key using a public key from a public/private key pair associated with the intermediary and to sign the encrypted session key with a digital signature, the endpoint-resident code being capable of sending the signed and encrypted session key to the intermediary; and intermediary-resident code stored on computer readable media and executable on the processor to authenticate the digital signature and decrypt the encrypted session key using a private key from the public/private key pair associated with the intermediary, the intermediary-resident code using the session key to decrypt the encrypted data as it is being exchanged between the two endpoints.

17. A software architecture as recited in claim 16, wherein the intermediary-resident code inspects the data in unencrypted form.

18. A software architecture as recited in claim 16, wherein the intermediary-resident code stores the data in unencrypted form.

19. In a network system having an internal client that exchanges encrypted data with an external client over a network and through a firewall intermediate of the internal and external clients, the encrypted data being encrypted using a session key known to the internal and external clients, computer-readable media distributed at the internal client and the firewall storing computer-executable instructions for:

encrypting the session key at the internal client;

signing the encrypted session key with a digital signature associated with the internal client;

passing the signed and encrypted session key to the intermediary;

authenticating, at the intermediary, the digital signature of the internal client;

decrypting the session key at the intermediary;

decrypting, at the intermediary, the encrypted data using the session key, and inspecting the data in route between the internal and external clients.

20. In a network system in which an encrypted data stream is transferred over a network between two endpoints and via an intermediary, the data stream being encrypted using a session key known to both endpoints, computer-readable media at one of the endpoints and at the intermediary storing computer-executable instructions for:

securely transferring the session key from one of the endpoints to an intermediary having access to the encrypted data stream;

decrypting the encrypted data stream at the intermediary using the session key; and inspecting the data stream following decryption.

* * * * *